United States Patent Office 3,213,483
Patented Oct. 26, 1965

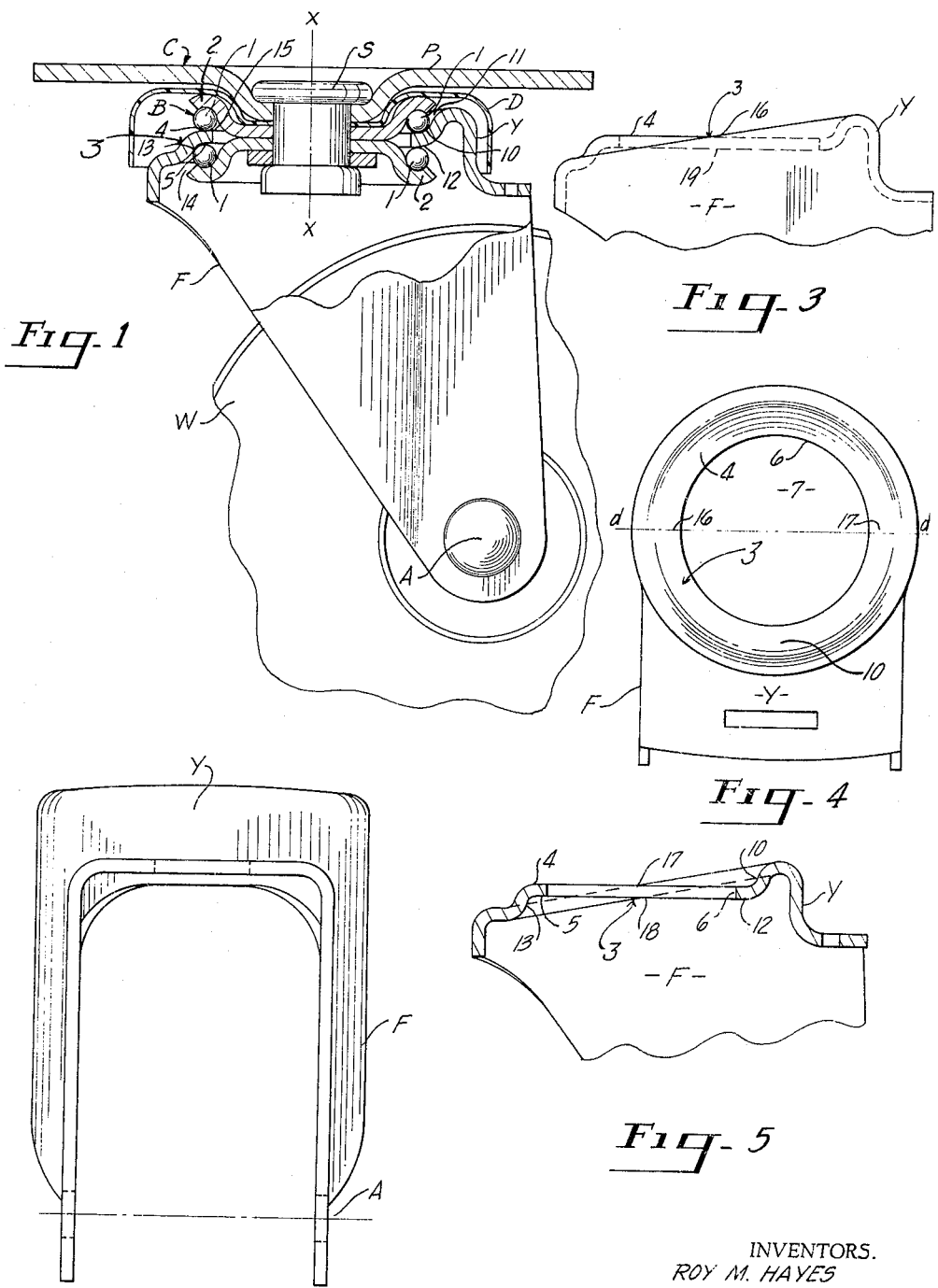

3,213,483
CASTER BEARING
Roy M. Hayes, Jonesboro, and Robert N. Hagan, Grosse Pointe Farms, Mich., assignors to The Colson Corporation, Chicago, Ill., a corporation of Ohio
Filed Mar. 23, 1964, Ser. No. 353,813
5 Claims. (Cl. 16—21)

This invention relates to swivel casters, and more particularly to improvements in, about and for a swivel thrust bearing therefor.

It is among the objects of our invention to provide a better swivel thrust bearing for a swiveling caster in respect to its life, cost, efficiency, strength, compactness and ultimate utility.

A more particular object is to provide a caster bearing having equally large diameter dual ball bearings with a common race and with great wrap-around support for the balls at the diametically and axially opposite places of high load and high pressure on the balls.

Another object is to provide a common race in the yoke of the caster fork for dual ball thrust bearings having great ball engaging surfaces where the balls are loaded greatly and having reduced wearing contact between the balls and the races where the load is smaller. Another object is to provide a three piece ball-race construction with and for two full and equal size ball bearings in the swivel thrust bearing of a swiveling caster with as full, and fully desirable, wrap-around support for the balls that carry the load as has been sought to be accomplished in prior and more complicated constructions, and with substantially equal load distribution among the balls subjected to diametrically and axially equal and opposite loads.

Other objects include providing equal radii from the swiveling axis for the bearing balls that are intended to be equally loaded; reduced lateral motion of the balls and of the caster fork relative to the swiveling axis; reduced wear on and of the balls and races with diminished contact area between the balls and the parts of the races that are lightly loaded; the maintenance of the centers of all the balls of each bearing in a true circle in one plane and parallel and equal to the circle and plane of the centers of the balls in the companion bearing.

These and other objects and advantages of our invention will more fully and at large appear from the following description of a preferred form and embodiment thereof, reference being had to the accompanying drawings in which:

FIGURE 1 is a side elevation, partly in vertical action, as to the swivel thrust bearing thereof, of our caster and bearing.

FIGURE 2 is an end elevation as viewed from the right FIGURE 1, of the fork and yoke of our caster.

FIGURE 3 is a fragmentary side elevation of the fork and yoke of FIGURE 2.

FIGURE 4 is a top plan view of the yoke of our caster fork, and

FIGURE 5 is a fragmentary vertical section of the upper part yoke part of the fork of our caster similar in view to FIGURE 1.

Our invention as herein exhibited in its preferred form has its office and being in a swivel caster C, FIGURE 1, which comprises a conventional flat, load bearing and attaching plate P, a wheel W and a fork F carrying the horizontal wheel axle A; the upper, bridging and bearing part of the fork comprising the yoke Y engaged in the swivel thrust bearing B the outer races of which are fixedly attached to the plate P by the upset spindle S which embraces the vertical swiveling axis $x$—$x$ of the caster in the center of the bearing B. A dust cover D taking the form of a thin, shallow, inverted, plastic or metallic, not necessarily rigid, cup is secured in its apertured middle between the upper race of the bearing B and the depressed middle of the plate P by the spindle S.

Turning now to the bearing B and yoke Y, FIG. 1, with which our invention is especially concerned, the bearing comprises upper and lower circular rows of balls 1, angularly spaced in close and free proximity with their centers in parallel, horizontal circles, parallel with the plate P (assuming the plate to be horizontally disposed, as it normally and usually is) and concentric with and normal to the axis $x$—$x$. The balls 1 are contained in and between like, upper and lower, annular races 2 which are uniformly and symmetrically formed with refrence to the axis $x$—$x$ and have about 180° of hardened, continuous, wrap-around, bearing surface in contact with the balls 1 in the oppositely inclined angular disposition approximately as shown in FIGURE 1. That is to say: The upper race fully supports the upper balls against upwardly and inwardly directed forces whilst the lower race fully supports the lower balls against downwardly an inwardly directed forces.

The yoke Y comprises and affords the middle race 3, see also FIGURES 3, 4 and 5, for the bearing B, and engages both rows of balls and separates the upper from the lower row. The yoke Y engages the balls in different ways at different places; firstly, on inner, annular, opposite, narrow, circular, upper and lower, hardened, substantially planar surfaces 4 and 5 respectively formed on and adjacent the annular inner rim portion 6 of the yoke which delineates, radially, the central aperture 7 in the yoke. The surfaces 4 and 5, as well as the rim 6, lie normal to and concentric with the axis $x$—$x$ of the bearing B. The surfaces 4 and 5 each include a bearing circle and/or narrow circular path like the circles of the diameters of the circular rows of the balls 1.

Secondly, the race 3 of the yoke on the side proximate the wheel axis A, rightwardly as viewed in FIGURES 1, 3 and 5, is formed with an upwardly rising ridge rising radially outwardly of the circular path of the surface 4 beginning in about the diameter $d$—$d$, FIG. 4, to provide an increasing ball-engaging bearing area to engage the upper row of balls with maximum wrap-around at 10, see also FIG. 4, while narrowly clearing the outer edge of the upper of the races 2 at 11, and engages the lower row of balls with minimum contact proximate the axle A on the lower surface 5 as at 12, FIGS. 1 and 5; the race 3 widely clearing the lower of the races 2 on the side of the bearing proximate the wheel axis A.

Thirdly, the race 3 of the yoke U on the side remote from the wheel axis A, leftwardly as viewed in FIGS. 1, 3 and 5, is formed to engage the lower row of balls equally and oppositely of the way the upper row of balls are engaged diametrically and axially opposite thereto; the race 3 being formed to engage the lower row of balls with maximum wrap-around diametrically remote from the axis A as at 13 with little clearance 14 from the margin of the lower race 2 whilst the race 3 engages the upper row of balls with minimum contact as at 15, equally and diametrically oppositely of the contact at 12.

Fourthly, the race 3 engages both the upper and lower rows of balls on, preferably only on, the narrow flat surfaces 4 and 5 in and adjacent the vertical plane of the neutral diameter $d$—$d$ and axis $x$—$x$, FIG. 4, and parallel to the wheel axis A, as at and closely about the points 16, 17, 18 and 19, FIGS. 3, 4 and 5, where the skew, or offset, load from the wheel axis A to the bearing B is neutral.

Fifthly, the race 3 is formed to engage about one-half the balls in both the upper and lower rows with progressively increasing wrap-around from the diameter d—d to the places where the skew load increases from neutral to maximum, and to engage the other half of the balls with no wrap-around in the places where the skew load is small and/or increasingly negative. That is to say, the upper hardened bearing surface of the race 3 has a progressively increasing ball-engaging curvature from the diameter d—d, and the points 16 and 17, FIGURES 4 and 5, toward the axle A to the point 10 where the ball-engaging wrap-around is maximum on the top side of the race. Equally and oppositely, diametrically and axially, the lower surface of the race 3 has progressively increasing ball-engaging, hardened, wrap-around surface from the diameter d—d, and the points 18 and 19, away from the axle A to, leftward as viewed in FIGS. 1 and 5, the point 13 of maximum, ball-engaging wrap-around on the bottom of the race. While the load-bearing upper half of the race on the side of the diameter d—d toward the axle A has an increasing load-bearing engagement with the upper circular row of balls, the other half of this circle of balls on the side of the diameter d—d remote from the axle A engages only the flat narrow circular bearing surface 4 of the race 3, as shown in FIGURE 1, at the point 15; the balls being retained in their desired circular formation by the wrap-around of the upper race 2. Correspondingly and oppositely, the balls of the lower circular row engage only the lower flat narrow circular bearing portion of the race 3, as shown at 12, from the diameter d—d around the semi-circular half of the race on the side toward the axle A.

By this novel formation of the race 3 of the yoke Y and its disposition in the middle of the dual bearing and its coaction with the equal, upper and lower, circular, coaxial rows of balls, the racial embrace and wrap-around support of the balls is proportioned in substantial accordance with the load that the balls are required to bear in the different arcuate parts of their circles; the balls in the upper circular row nearest the axle A, and the balls in the lower circular row most remote from the axle A, taking the greater part of the skew load by virtue of the offset of the axle from the swivel axis x—x of the caster and of the bearing. The balls nearer the neutral diameter d—d are not lost to the enterprise since, inter alia, they are present to participate in shock and random loads and to resist deleterious circumferential separation of the most heavily loaded balls. Moreover, each swiveling motion of the caster about the axis x—x brings different balls into the arcuate zones of high load and puts others over into places of light or negative load.

Our invention permits the bearing B to comprise two large and equal diameter circular rows of balls with maximum wrap-around ball-engaging contact with the races at the loaded places, but with greatly reduced wrap-around contact, and therefore greatly reduced friction and slippage between the balls and the races, where the bearing load is small. Our invention affords a broad, balanced symmetrical couple of forces in the bearing to carry the skew load of the caster whereby to avoid overloading one small diameter race to get money's worth of load out of a companion race of larger diameter. Our invention also provides reduced bearing wear with snug fits and negligible lateral slop in the bearing with resulting long life and much satisfaction therefrom.

Those skilled in the art will need no special instruction about hardening the bearing surfaces of our races since conventional hardening of the ball-engaging areas has been found sufficient to permit the advantages of our invention to be enjoyed. Similarly, conventional cadmium or zinc plating such surfaces for the reduced friction obtained thereby may also be employed.

And, while we have illustrated and described a preferred form and embodiment of our invention and taught our best present knowledge about the use and advantages of it, changes and improvements will occur to those skilled in the art who come to use and enjoy our invention and practice the precepts hereof, all without departing from the essential principles of our invention or the essence and substance of the teaching of this specification. Therefore we do not want to be limited or restricted in the scope and effect of our patent to the form of our invention herein specifically illustrated and described nor in any other way inconsistent with the progress by which the art has been promoted by our invention.

We claim:

1. A caster having a vertical swiveling axis, a fork with a wheel axis offset from the swiveling axis and a swivel thrust bearing supporting said fork for rotation about the swiveling axis in which the said bearing comprises upper and lower circular rows of balls concentric with, normal to an axially spaced along said swiveling axis, ball races engaging said rows of balls respectively above the upper row and below the bottom row, said fork comprising a yoke portion generally normal to said swiveling axis and comprising a middle race for and engaging all the balls of both said circular rows of balls in upper and lower planes respectively and both planes normal to said axis and with maximum curved ball engaging areas formed to engage the upper row of balls on the side of the bearing toward said wheel axis and to engage the lower row of balls on the side of the bearing remote from said wheel axis.

2. The caster of claim 1 in which said upper and lower races have annular grooves within which said balls are engaged, the groove in said upper race facing downwardly and outwardly and the groove of the lower race facing upwardly and outwardly, the said curved ball engaging areas in said middle race having grooved portions facing oppositely of said grooves in the races respectively adjacent thereto, the said grooves and grooved portions approaching full circular engagement with the balls in the plane of the swiveling axis which is normal to the wheel axis.

3. In a caster having a spindle with vertical axis, a fork with a wheel axis offset from the spindle axis, and a swivel thrust bearing supporting the fork for rotation about the spindle axis, the improvement wherein said bearing comprises upper and lower circular rows of balls of like diameter concentric with said spindle axis and normal thereto and axially spaced along said axis, upper and lower ball races engaging said rows of balls respectively above the upper row and below the lower row in annular grooved bearing surfaces, said fork comprising a yoke portion of general horizontal disposition normal to said spindle axis with a central aperture concentric with said axis and of diameter less than the minimum diameter of said rows of balls, and said yoke also comprises a middle race for both said circular rows of balls with maximum curved ball-engaging areas engaging the upper row of balls on the side of the bearing toward said wheel axis and engaging the lower row of balls on the side of the bearing remote from said wheel axis.

4. The caster of claim 3 in which the said maximum curved ball-engaging areas of said middle race have grooved portions facing respectively inwardly and upwardly on the side of the bearing toward said wheel axis and facing downwardly and inwardly on the side of the bearing remote from said wheel axis, the balls adjacent the plane of the swivel axis which is normal to the wheel axis being deeply engaged in the juxtaposed grooves of the races in and adjacent said plane.

5. A middle race for a double row swivel ball thrust bearing for a caster formed in the yoke of a caster fork which has a wheel axis, wherein the race comprises a central part having axially opposite narrow circular ball-engaging surfaces of diameters equal to the diameters of the circles of centers of the upper and lower rows of balls having rolling contact therewith and lying parallel with said circles, a first diametrically semi-circular, axially tapered, ball-engaging part formed in said yoke and lying radially outwardly of said central part and rising from a diameter of said first part parallel to said wheel axis to maximum axial extent adjacent said wheel axis and having increased ball-engaging wrap-around from said last named diameter to said place of maximum axial extent, and a second diametrically semicircular, axially tapered, ball-engaging part equal to said first named part and oppositely formed in said yoke both axially and diametrically.

References Cited by the Examiner

UNITED STATES PATENTS

| | | | |
|---|---|---|---|
| 1,892,845 | 1/33 | McGrath | 16—21 |
| 2,617,668 | 11/52 | Stewart | 16—21 |
| 2,963,732 | 12/60 | Kramcsak et al. | 16—21 |
| 2,971,211 | 2/61 | Kramcsak | 16—21 |
| 2,990,191 | 6/61 | Black | 16—21 |

JOSEPH D. SEERS, *Primary Examiner.*

DONLEY J. STOCKING, *Examiner.*